(12) United States Patent
Chakraborty et al.

(10) Patent No.: US 9,702,705 B2
(45) Date of Patent: Jul. 11, 2017

(54) CROWD-ASSISTED MICRO-NAVIGATION

(71) Applicant: International Business Machines Corporation, Armonk, NY (US)

(72) Inventors: Dipanjan Chakraborty, Bangalore (IN); Sumit Mittal, Bangalore (IN); Parikshit Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 14/582,352

(22) Filed: Dec. 24, 2014

(65) Prior Publication Data

US 2016/0187138 A1 Jun. 30, 2016

(51) Int. Cl.
*G01C 21/20* (2006.01)
*G01S 5/02* (2010.01)
*H04W 4/02* (2009.01)
*H04W 4/00* (2009.01)

(52) U.S. Cl.
CPC ........... *G01C 21/20* (2013.01); *G01C 21/206* (2013.01); *G01S 5/0289* (2013.01); *H04W 4/023* (2013.01); *H04W 4/008* (2013.01)

(58) Field of Classification Search
None
See application file for complete search history.

(56) References Cited

U.S. PATENT DOCUMENTS

| 8,145,417 | B1 * | 3/2012 | Chitre | G01C 21/362 264/328.3 |
| 8,892,360 | B2 * | 11/2014 | Otani | G01C 21/3664 345/418 |
| 8,947,531 | B2 * | 2/2015 | Fischer | G01S 7/003 348/148 |
| 2009/0315776 | A1 | 12/2009 | Knosravy et al. | |
| 2010/0256852 | A1 * | 10/2010 | Mudalige | G08G 1/22 701/24 |
| 2012/0166077 | A1 | 6/2012 | Herzog et al. | |
| 2012/0176525 | A1 | 7/2012 | Garin et al. | |

(Continued)

OTHER PUBLICATIONS

IBM, System and Method for Displaying Directions. IPCOM000175731D, Oct. 21, 2008.

(Continued)

*Primary Examiner* — John R Olszewski
*Assistant Examiner* — James M McPherson
(74) *Attorney, Agent, or Firm* — Ryan, Mason & Lewis, LLP

(57) ABSTRACT

Methods, systems, and computer program products for crowd-assisted micro-navigation are provided herein. A method includes determining a navigation route between a first user device and a second user device within a given environment; defining a virtual boundary to surround the navigation route; implementing a first set of one or more additional user devices within the given environment to (i) detect movement of the first user device outside of the virtual boundary and (ii) generate an alert upon detection of movement of the first user device outside of the virtual boundary; and implementing a second set of one or more additional user devices within the given environment to measure a wireless signal received from the first user device to enable triangulation of the location of the first user device, in response to the alert.

20 Claims, 8 Drawing Sheets

(56) References Cited

U.S. PATENT DOCUMENTS

| | | | | |
|---|---|---|---|---|
| 2014/0163861 | A1* | 6/2014 | Beaurepaire | G06Q 10/00 701/400 |
| 2015/0204676 | A1* | 7/2015 | Zhang | G01C 21/206 701/410 |
| 2016/0161269 | A1* | 6/2016 | Needham | G01C 21/34 701/410 |
| 2016/0178379 | A1* | 6/2016 | Moraru | G01C 21/206 701/522 |
| 2016/0227510 | A1* | 8/2016 | Reed | H04W 64/006 |

OTHER PUBLICATIONS

Hamhoum et al., Scalable navigation support for crowds: personalized guidance via augmented signage. In Proc. COSIT, 2011, pp. 40-56.

Rukzio et al., Design, implementation and evaluation of a novel public display for pedestrian navigation: the rotating compass. CHI 2009, Apr. 4-9, 2009, Boston, MA, USA.

Burigat et al., Pedestrian Navigation with Degraded GPS Signal: Investigating the Effects of Visualizing Position Uncertainty. 13th International Conference on Human-Computer Interaction with Mobile Devices and Services, ACM Press, New York, Sep. 2011, pp. 221-230.

Warnant et al., Space Weather Influence on Satellite-based Navigation and Precise Positioning. Space Weather, Astrophysics and Space Science Library vol. 344, 2007, pp. 129-146.

Rehman et al., Impacts of Human Body on Built-in GPS Antennas for Mobile Terminal in Multipath Environment. Fourth European Conference on Antennas and Propagation (EuCAP), Barcelona, Spain, Apr. 12-16, 2010. Barcelona: IEEE, pp. 1-5.

Constandache et al., Did you see bob?: human localization using mobile phones. In Proceedings of the sixteenth annual international conference on Mobile computing and networking, ACM (2010), 149-160.

Constandache et al., Towards mobile phone localization without war-driving. In INFOCOM, 2010 Proceedings IEEE, IEEE (2010), 1-9.

Wikipedia' Wide Area Augmentation System. https://en.wikipedia.org/w/index.php?title=Wide_Area_Augmentation_System&oldid=635649572, Nov. 27, 2014.

Hamhoum et al., Supporting pilgrims in navigating densely crowded religious sites. Personal and Ubiquitous Computing 16, 8 (2012), 1013-1023.

Harter et al., The anatomy of a context-aware application. Wireless Networks 8, 2/3 (2002), 187-197.

Higuchi et al., An efficient localization algorithm focusing on stop-and-go behavior of mobile nodes. In Pervasive Computing and Communications (PerCom), 2011 IEEE International Conference on, IEEE (2011), 205-212.

Higuchi et al., Clearing a crowd: Context-supported neighbor positioning for people-centric navigation. In Pervasive Computing. Springer, 2012, 325-342.

Kloch et al., Collaborative pdr localisation with mobile phones. In Wearable Computers (ISWC), 2011 15th Annual International Symposium on, IEEE (2011), 37-40.

Krakiwsky et al., A kalman filter for integrating dead reckoning, map matching and gps positioning. In Position Location and Navigation Symposium, 1988. Record. Navigation into the 21st Century. IEEE Plans '88., IEEE, IEEE (1988), 39-46.

LaMance et al., Assisted gps: a low-infrastructure approach. GPS World 13, 3 (2002).

Nassar et al., Improving positioning accuracy during kinematic dgps outage periods using sins/dgps integration and sins data de-noising. Survey Review 37, 292 (2004), 426-438.

Olofsson et al., The friend locator: supporting visitors at large-scale events. Personal and Ubiquitous Computing 10, 2-3 (2006), 84-89.

Parkinson et al., Global Positioning System: Theory and applications, vol. 2 (1996).

Peng et al., Beep-beep: a high accuracy acoustic ranging system using cots mobile devices. In Proceedings of the 5th International conference on Embedded networked sensor systems, ACM (2007), 1-14.

Priyantha et al., The cricket location-support system. In Proceedings of the 6th annual international conference on Mobile computing and networking, ACM (2000), 32-43.

Rehman et al., Effects of human body interference on the performance of a gps antenna. In Antennas and Propagation, 2007. EuCAP 2007. The Second European Conference on, IET (2007), 1-4.

Wada et al., Accurate positioning of mobile phones in a crowd using laser range scanners. In Wireless and Mobile Computing, Networking and Communications (WiMob), 2013 IEEE 9th International Conference on, IEEE (2013), 430-435.

Wang et al., Bluetooth indoor positioning using rssi and triangulation methods. 2013 IEEE 10th Consumer Communications and Networking Conference (CCNC).

Yoshimi et al., Pdr-based adaptation for user-progress in interactive navigation system. In Proceedings of the 2013 ACM conference on Pervasive and ubiquitous computing adjunct publication, ACM (2013), 263-266.

\* cited by examiner

CROWD-ASSISTED MICRO-NAVIGATION

FIELD OF THE INVENTION

The present application generally relates to information technology, and, more particularly, to navigation techniques.

BACKGROUND

Events such as, for example, festivals, sporting events, and musical concerts are commonly popular and well-attended. People often attend or visit such events in connection with friends, family, and/or as part of a social group. Accordingly, in many instances, individuals can spend non-trivial amounts of time attempting to converge with one or more other individuals at a common meeting ground within the event environment. However, such events routinely present multiple navigational challenges.

For example, noise from loud music, large crowds of people, etc., can render telephonic voice conversations difficult and/or even impossible. Also, event environments that include open space(s) can render navigation difficult due to a lack of infrastructural setup for identifying locations and/or landmarks within the environment.

Additionally, the presence of human bodies (such as, for example, crowds of people) can reduce visibility and contribute to network accessibility and/or bandwidth issues. Such issues can lead to high convergence times and a frustrating user experience due to a high number and frequency of oscillations in a navigation path, particularly in densely populated environments.

SUMMARY

In one aspect of the present invention, techniques for crowd-assisted micro-navigation are provided. An exemplary computer-implemented method can include steps of determining a navigation route between a first user device and a second user device within a given environment; defining a virtual boundary to surround the navigation route; implementing a first set of one or more additional user devices within the given environment to (i) detect movement of the first user device outside of the virtual boundary and (ii) generate an alert upon detection of movement of the first user device outside of the virtual boundary; and implementing a second set of one or more additional user devices within the given environment to measure a wireless signal received from the first user device to enable triangulation of the location of the first user device, in response to the alert.

In another aspect of the invention a crowd-assisted navigation device can include a navigation service module, executing on the crowd-assisted navigation device, to determine a navigation route between a first user device and a second user device within a given environment and define a virtual boundary to surround the navigation route. The device also includes a collaboration service module, executing on the crowd-assisted navigation device, to implement a first set of one or more additional user devices within the given environment to (i) detect movement of the first user device outside of the virtual boundary and (ii) generate an alert upon detection of movement of the first user device outside of the virtual boundary. The collaboration service module also implements a second set of one or more additional user devices within the given environment to measure a wireless signal received from the first user device to enable triangulation of the location of the first user device, in response to the alert. Further, the device additionally includes a coordination module, executing on the crowd-assisted navigation device, to coordinate communication between the navigation service module and the collaboration service module. Also, the navigation service module, the collaboration service module, and the coordination module are coupled to (i) a graphical user interface for user manipulation of the crowd-assisted navigation device, and (ii) a display for presentation to a user.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
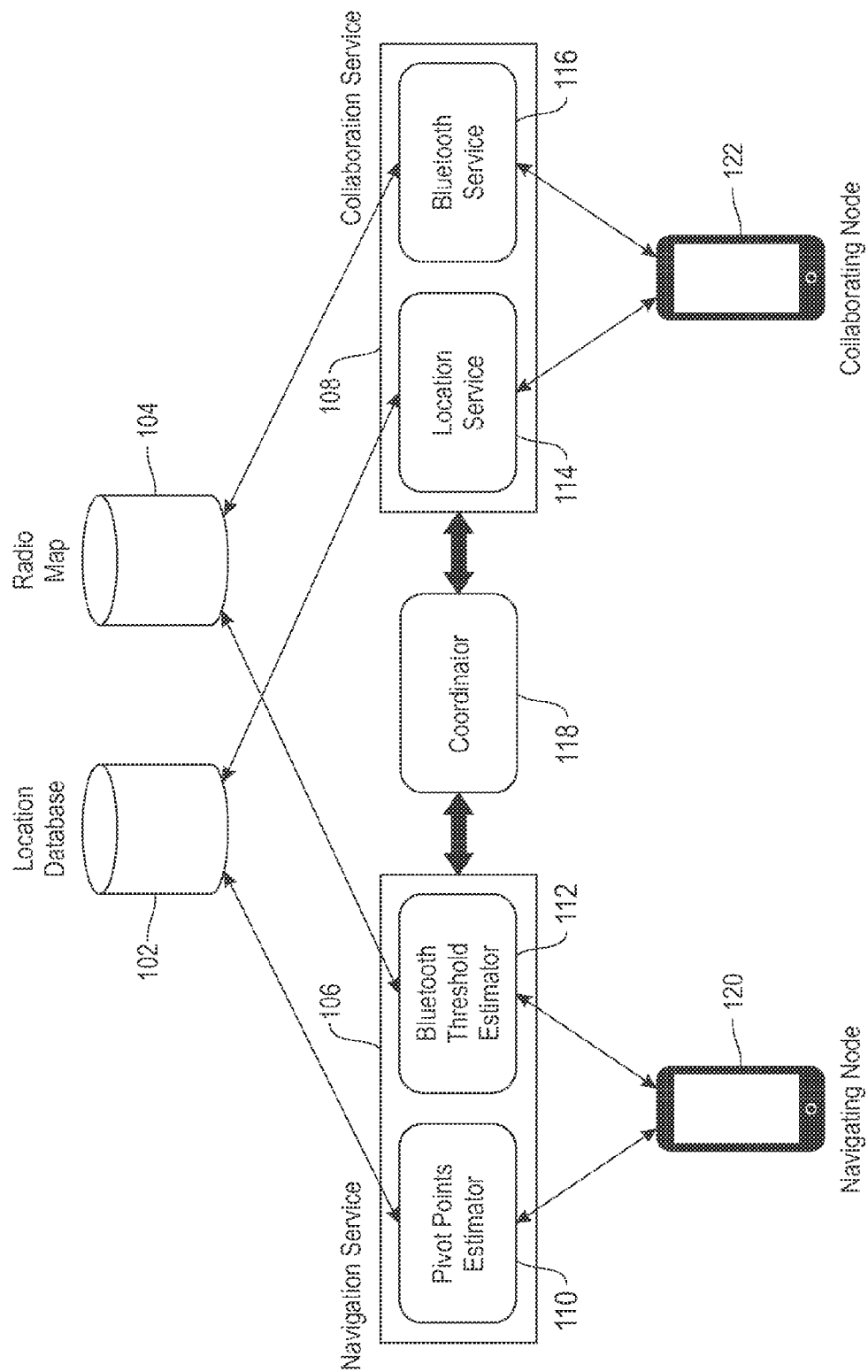
FIG. 1 is a diagram illustrating system architecture, according to an example embodiment of the invention.

As described herein, an aspect of the present invention includes techniques for crowd-assisted micro-navigation in environments, particularly large and dense environments. By way of illustration, one or more examples described herein include a first user or individual—referred to herein as Adam—attempting to locate and/or being directed to the location of a second user or individual—referred to herein as Bob.

In one or more embodiments of the invention, a given device associated with a user (such as Adam) is prompted to repeatedly provide updated information pertaining to the location of the device to avoid unbounded drifts and frequent requests for the user (Adam) to oscillate. As used herein, an oscillation refers to a change of direction, and a request for the user to oscillate refers to an instruction to the user to change direction. Accordingly, oscillations can be frustrating for a user during a navigation task.

Additionally, an aspect of the invention includes creating a virtual tunnel (or boundary) between Adam and Bob based on reliable pivot points (for example, user devices and smart phones associated with other users at the event) within the event environment. At least one embodiment of the invention includes incorporating an assumption that devices that are static (such as devices associated with standing and/or stationary users) have a higher location accuracy, and such embodiments include using such devices as pivot points to monitor a virtual tunnel. Accordingly, such embodiments include using neighboring Bluetooth® devices to detect when a given user (Adam) is not in the monitoring zone associated with each such Bluetooth® device, thereby implementing boundaries of the created virtual tunnel.

It should also be noted that while Bluetooth® is described herein in connection with one or more example embodiments of the invention, additional embodiments of the invention can include using and/or implementing other mechanisms such as Bluetooth® low energy (BLE), near-field communication (NFC), etc., as would be appreciated by one skilled in the art.

As such, and as further detailed herein, at least one embodiment of the invention includes determining a navigation route within an event environment between two or more devices (such as a device associated with Adam and a device associated with Bob) using positioning and ranging technologies such as global positioning system (GPS) and/or Bluetooth®, wherein such a determination includes defining a boundary (that is, a virtual tunnel) for maximum deviation in the navigation route based on current (and updated) information. Such an embodiment further includes providing one or more guards to prevent a given level of deviation from the navigation route (that is, to prevent deviation outside of the defined boundary). Such guards, as described herein, can include infrastructural and/or crowd-sourced beacons implemented to infer if and/or when a given user device (Adam) has entered the scope associated with the given beacon (that is, inferring that the given user device has deviated from the virtual tunnel). Further, one or more embodiments of the invention also include incorporating flashing or highlighting pivot points (also referred to herein as flood lights) if and/when a given user device (Adam) deviates from the scope of the guards.

By way of illustration, consider a two-dimensional physical space $\mathbb{X}$ hosting a set of users $\mathbb{P}$. Let $P_i$ and $P_j$ be two users from $\mathbb{P}$ who are present at distinct locations in $\mathbb{X}$. In this example, user $P_i$, whose predicted location is $L_i$, needs to navigate to $P_j$, predictably located at $L_j$. Let $U_i$ and $U_j$ represent the radii of uncertainty in their respective locations, obtained from their respective GPS signals (or any other suitable base localization protocol). Uncertainty can represent, for example, a given user having a k % probability of being present at a given location. As such, the source and destination both have uncertainties and may be at a variable distance from each other, with a variable amount of crowd through which to navigate.

If Z=the distance between the two centroids of the circles that represent the two users ($P_i$ and $P_j$), initially, the users may be separated by $Z+U_i+U_j$. As a simplistic representation, if $P_i$ walks along the line joining the centers, when the circles coincide, the actual distance between the two centroids can be $2(U_i+U_j)$. Once $L_i$ and $L_j$ coincide, the actual distance between the two users can be as much as $U_i+U_j$ or higher, although the predicted distance to converge is zero.

With respect to defining a convergence criterion, a navigation algorithm has achieved convergence if the actual positions of $P_i$ and $P_j$ are within $\rho$ meters of each other ($d_{actual}(p_i, p_j) \leq \rho$), implying $p_i$ can now positively identify $p_j$. Note that $\rho$ is affected by the visibility range in the environment (affected, for example, by crowd size, time of day, etc.). As such, $\rho$ may vary due to environmental factors. If $\rho$ is reasonably high, GPS might be sufficient; for instance, when $\rho \geq (U_i+U_j)$. However, for dense environments, $\rho$ may need to be a reasonably small value (for example, 2-4 meters), and as such, GPS may not suffice.

Accordingly, and as detailed herein, at least one embodiment of the invention includes throttling location drifts and ensuring convergence by utilizing one or more individuals (or devices) within the event crowd as the infrastructure, as well as factoring-in crowd density and the impacts caused as a result thereof (such as, for example, degraded signals, Bluetooth® attenuation, and user experience).

At least one embodiment of the invention includes determining and/or displaying the predicted location of $P_i$ (Adam) and $P_j$ (Bob) on a map. Maps with compass support and underlying geographic information system (GIS) data provide Adam a heading direction to follow. Let $t_{ij}$=the time for $P_i$ to traverse to $P_j$, which is also referred to herein as the convergence time. At least one embodiment of the invention includes terminating providing navigational guiding when Adam has registered convergence (for example, when Adam has seen Bob). Such a registration by Adam can be carried out, for example, via manipulation of and/or input to his user device (within which an application implementing an embodiment of the invention is executing).

Additionally, if $\mathbb{T}$ is a suggested trajectory route from Adam to Bob, at least one embodiment of the invention includes defining a virtual tunnel of predefined width along that trajectory through which Adam is to navigate, in contrast to instructing Adam to follow a single straight line path. Such an embodiment provides the user (Adam) increased flexibility to choose to traverse towards the destination along $\mathbb{T}$, being conscious to avoid people and/or obstacles. The virtual tunnel ensures that the drifts in Adam's location from $\mathbb{T}$ due to inaccuracy in the underlying location prediction algorithm (such as, for example, a GPS-based algorithm, a Pedestrian Dead Reckoning (PDR) algorithm, etc.) or due to the particular path taken by Adam does not exceed the virtual tunnel width. The length of the virtual tunnel is guarded by elements referred to herein as guards. Guards are users or user devices, other than Adam and Bob (in this example), whose position is known with sufficient accuracy and who have a device (such as a smartphone) equipped with, for example, Bluetooth®. These guard devices listen for signals from Adam's device, and whenever a signal is received by one of the guard devices, that guard device raises a virtual alarm which is sent to the server, signaling that Adam has deviated from the pre-defined virtual tunnel. The server, based on this alarm, notifies other devices (described further herein and referred to as flood lights) to recalibrate Adam's position.

Additionally, in at least one embodiment of the invention, guards can also include static beacons that are strategically placed by the event organizers.

Accordingly, as soon as the user (Adam) contacts one of the guards, the user (Adam) is instructed to return to within the boundaries of the virtual tunnel via feedback mechanisms such as user device (phone) vibrations. Subsequently, a recalibration routine based on one or more Bluetooth® neighbors of the user (Adam) is implemented to estimate the user's (Adam's) current location. Once Adam's current location is estimated, at least one embodiment of the invention includes determining (and providing to the user (Adam)) the next heading direction. For example, such an embodiment can include generating an alarm (to be perceived by the user) using haptic mechanisms such as a beep, a vibration, etc., when the user moves outside of the virtual tunnel. As such, at least one embodiment of the invention includes constraining the convergence time while reducing the number of oscillations Adam takes while traversing along $\mathbb{T}$.

As such, when Adam expresses a desire to navigate to Bob, at least one embodiment of the invention includes defining a virtual tunnel along the path from Bob to Adam (such as further detailed herein in connection with FIG. 2A through FIG. 2E). Within the boundaries of the virtual tunnel, Adam is allotted a measure of flexibility; for example, Adam may choose to follow a largely linear directional path towards Bob, or Adam may take deviations from the linear path to traverse less crowded regions of the environment (contained within the virtual tunnel boundaries). At least one embodiment of the invention includes monitoring Adam (more specifically, the user device associated with Adam) to determine if Adam has crossed outside of the virtual tunnel boundaries, and engaging with Adam (for example, via one or more haptic mechanisms, as detailed above) only when such action transpires. In such an instance, at least one embodiment of the invention includes providing instructions to Adam to proceed along a direction towards the virtual tunnel. Accordingly, at least one embodiment of the invention includes providing the user (Adam) freedom to choose a desired route within the boundaries of the generated virtual tunnel (thus minimizing the number of oscillations), while also limiting the expansion of the user's convergence time by constraining the user's drifts.

To maintain virtual tunnels and recalibrate Adam's position when necessary, at least one embodiment of the invention relies on additional user devices (associated with other attendees of the given event) within the environment that are also referred to herein as guards and flood lights. These additional user devices (also referred to herein as pivot points) can, by way of example, be user devices within which an application implementing an embodiment of the invention is executing, and that are present in the navigation space S.

As used herein, a guard refers to a node (that is, a device) that detects when a given user (such as Adam) has exited the virtual tunnel (that is, moved outside of the virtual tunnel boundaries) and raises a virtual alarm upon such an exit. A guard carries out such detection by monitoring a zone (that is a portion of the event environment) and determining whether or not the user is seen (or detected) in the zone. By way of illustration, the zone$_i$ of a guard $G_i$ can be defined as a radius $r_i$ around $G_i$, wherein $G_i$ is the predicted location of the guard. At least one embodiment of the invention includes selecting a node as a guard $G_i$ if zone$_i$ is such that its boundary acts as a perimeter for at least a portion of the virtual tunnel. $r_i$ is modeled such that the probability of $G_i$ seeing a new Bluetooth® device $P_i$ with rss$_i$ $p(g_i, r_{ssi})$ is $\geq \beta$, wherein $\beta$ is a predetermined threshold value (as further detailed herein, and wherein RSS stands for received signal strength).

Additionally, as used herein, a flood light is a node (that is, a device) that is activated once a virtual alarm is triggered by a guard. A combination of flood lights can be implemented to assist, if necessary, in the recalibration of the given user's location. A role of flood lights includes improving the confidence of the predicted location of the given user (Adam). When a virtual alarm is triggered, at least one embodiment of the invention includes identifying one or more nodes that are nearby to Adam. Subsequently, the flood lights use Bluetooth® RSS-based models to triangulate the location of Adam.

In at least one embodiment of the invention, guards and flood lights are nodes whose location coordinates are known with reasonable accuracy. For example, in one or more embodiments of the invention, it is assumed that the error range of GPS signals is lower when a user is stationary (standing or sitting, for example) versus in motion (walking, for example), even in the presence of a crowd.

At least one embodiment of the invention includes modeling Bluetooth® attenuation-based distances. As such, once the guards and flood lights have been determined, the efficacy of the guards and flood lights depends on the modeling of the distance between a guard and/or a flood light and a given (potentially un-encountered) device. Based on an assumption that, despite high variance, the maximum received signal strength indication (RSSI) observed at distance d is a decreasing function of d (that is, at a distance greater than x, the RSS value never crosses y), at least one embodiment of the invention includes creating a distance modeling approach. In connection with at least one embodiment of the invention, this modeling is carried out in a crowd-sourced manner. Instead of using expected_distanced (x, y), such an embodiment includes using a maximum expected distance $d_{max}(x, y)$ to predict the maximum expected distance (x) when Adam observes RSS (y) from a given pivot point.

In a navigation scenario, it is possible that the pivot points have not previously encountered the navigator (Adam). As such, the values of x and y are different for different crowd dynamics. Accordingly, at least one embodiment of the invention includes partitioning the event environment area into multiple sub-areas, also referred to herein as grids, in which each have a uniform crowd density. Such sub-areas can, for example, represent portions of the event environment area where the crowd dynamics stay invariant for long periods of time. For instance, at a concert event, the crowd is commonly dense near the stage and comparatively less dense towards the boundaries of the event environment area.

In at least one embodiment of the invention, the $d_{max}(x, y)$ values for each grid can be determined by exploiting available pivot points. Because the pivot points are relatively static and with known locations, such pivot points can also scan each other using Bluetooth®. By way of example, if n pivot points are present in an area, $^nC_2$ scan combinations of observed RSS readings y can be received, along with expected maximum distance x.

Such a process does not rely on Adam, who may be mobile and having variable location estimates, while using the crowd to infer Bluetooth® attenuation coefficients in different grids.

Additionally, $\beta$ is a threshold that guards use to model their zone radius $r_i$, and $r_i$ is modeled such that the probability of $G_i$ to see a new Bluetooth® device $P_i$ at a distance $r_i$ with RSS rss$_i$ $p(g_i, r_{ssi})$ is $\geq \beta$. Accordingly, using a Bluetooth®-based distance estimation routine, at least one embodiment of the invention includes determining the probability of two devices seeing each other in the same environment and learning the expected spatial probability function. As used herein, expected spatial probability function refers to the probability of a device (receiver) to receive Bluetooth® signals/beacons from another device (sender) at varying distances from the sender. This probability will be one at very close distances from the sender, and decreases with increasing distance.

Additionally, once a user (Adam) has been detected to have exited the virtual tunnel, a recalibration function is used to re-calculate his expected position. To re-calculate Adam's expected position, available flood lights that are near to Adam are utilized. The RSS of the flood lights, observed by Adam, is used to estimate Adam's maximum_expected_distance from the flood lights using the pre-calculated $d_{max}(x, y)$ of that grid. Further, triangulation techniques can be applied, using the maximum_expected_distance from the available flood lights, to select a probable position where Adam can be located. Additional confidences, provided by available location estimates from GPS and PDR, can also be utilized, using the Kalman filter to estimate a final expected position of Adam. As would be appreciated by one skilled in the art, the Kalman filter operates recursively on streams of noisy input data to produce a statistically optimal estimate of the underlying system state. In the example above, the Kalman filter combines multiple data sources, for example, from GPS, Bluetooth® triangulation and Pedestrian Dead Reckoning (PDR), to determine an estimate of the probable location of Adam, which can be more accurate than that reported by each of these sources individually.

For scenarios of increased proximity, PDR can be used as a base algorithm, along with the Bluetooth® recalibration function. By way of example, as soon as the given scopes of Adam and Bob touch each other, a re-calibration process can be initiated, wherein nearby flood lights are activated to triangulate a user to the user's most probable location. In addition, the virtual tunnel width can be reduced to ensure that the drift from the designated path is minimized. Subsequently, PDR can be utilized to navigate Adam to Bob, and additionally, the shortening of the virtual tunnel reduces the iterations for convergence. PDR utilizes sensors on a device (smartphone) such as an accelerometer, a gyroscope and a compass to determine user orientation and the number of steps taken. This information is used to predict the next location of the user given the previous location. This technique can be prone to drifts and errors over time. However, in the proximity case considered when the distance between Adam and Bob is short, such a technique can be used to track the user movement in the small area. Any drifts that accumulate can be filtered out by the virtual tunnel.

FIG. 1 is a diagram illustrating system architecture, according to an embodiment of the invention. By way of illustration, FIG. 1 depicts a location database 102, a radio map database 104, a navigation service module 106, a collaboration service module 108, a coordinator module 118, a navigation node 120 (such as a user device associated, for example, with Adam, per the example discussed herein) and a collaborating node 122, which can include one or more separate user devices (other than Adam) that are present in the given environment and have an application executing an embodiment of the invention installed thereon. The navigation service module 106 further includes a pivot points estimator component 110 and a Bluetooth® threshold estimator component 112. Additionally, the collaboration service module 108 includes a location service component 114 and a Bluetooth® service component 116.

Location service component 114 periodically receives location data from all registered users in the crowd and stores such data to the location database 102. Such data are further used by the pivot point estimator module 110, which uses the data to find static users in the crowd who can act as guards and/or flood lights. The pivot point estimator module 110 analyzes location traces derived from registered devices (for example, smartphones) in the crowd to determine which users are relatively static. Bluetooth® Service component 116 collects data of Bluetooth® scans (such scans are pairs of [device identifier (ID), received signal strength indication (RSSI)]) performed by pivot points in the crowd and stores the data in the radio map database 104. This information is used by the Bluetooth® threshold estimator module 112, which estimates the Bluetooth® attenuation coefficient in different grids (different grids will have different attenuation due to varying crowd densities).

Accordingly, as depicted, the example embodiment of the invention illustrated in FIG. 1 includes utilizing client-server architecture, wherein the client (in this instance, the navigating node 120) can query the server for the client's 120 location, or the location of one or more other individuals within a given environment who have shared their locations. The client, as detailed herein, can also request the server to provide navigation aid to one or more individuals within the given environment.

An additional client (in this instance, the collaborating node 122) also periodically sends its (that is, the client's 122) location to the location service component 114 to enable the server to determine nodes in the given environment which are static and/or have not moved for a given duration of time. A client (here, either node 120 or node 122) can sense its environment (for example, can sense and/or detect Bluetooth® and/or Bluetooth® low energy (BLE) signals nearby) upon request from the server. Such information assists the server in building a radio map of the environment which can be used to infer Bluetooth® attenuation coefficients and thus, the proximity between the receiver and the transmitting node.

Referring back to FIG. 1, at least one embodiment of the invention can include a cloud-hosted navigation service module 106 (which can be a server) that communicates with a navigation help service component, such as client navigation node 120. The navigation node 120 is additionally integrated with one or more additional clients, such as collaborating node 122, via an application executing on each of the client devices (such as node 120 and 122). The application, as detailed herein, can provide the navigation help service detailed in connection with one or more embodiments of the invention.

Via the application, a client (such as node 120 and/or node 122) can receive REQUEST or CONTROL statements. REQUEST statements request the client to report information such as GPS coordinates, Bluetooth® scan results, and/or a current locomotive state (sitting, standing, walking, etc.). CONTROL statements represent requests for specific actions to be taken on the client devices such as, for example, turning-on or activating Bluetooth® capabilities. Clients, via the application, can employ NAVIGATE statements to request the navigation service. The client device presents a prompt to the user to specify participation preferences at the time of installation of the application. For example, the user can choose from options such as the following: (1) NONE: User does not want to participate and/or request service; (2) NAVIGATOR: User wishes to use the service but not participate in assisting other requests; (3) PARTICIPATOR: User wishes to use the service and participate in assisting other requests. A PARTICIPATOR has the option to manually turn OFF participation and specify filters to turn OFF participation under certain parameters (for example, if the battery level of the client device is at or below a given threshold level).

The server hosts exposed services encompassed by the navigation service (NAV SERV) module 106 and the collaboration service (COLLAB SERV) module 108, as well as the internal coordination service (COORD SERV) module 118. When a NAVIGATE request arrives at NAV SERV module 106, the COLLAB SERV module 108 determines a list of guards, and sends CONTROL statements to those guards, prompting the guards to turn their Bluetooth® ON. In at least one embodiment of the invention, the client (such as navigation node 120) is provided the list of guards, and, using periodic Bluetooth® scans, the client 120 checks for virtual tunnel exit events. The guard devices can also be provided the Bluetooth® media access control (MAC) address of the client 120, such that each guard device can run Bluetooth® scans, check for signals received from the client and notify the server if a virtual tunnel breach is detected.

In at least one embodiment of the invention, the load of performing Bluetooth® scans during a navigation task to detect if a device exists the virtual tunnel is provided to the client requesting the service (that is, node 120). If the client detects Bluetooth® signals from the list of guards, a virtual alarm is triggered to the server and a haptic feedback is triggered to the client. Once a virtual alarm has been triggered, the NAV SERV module 106 determines a list of flood light devices to be used to recalibrate the client's (node 120) location. The flood light devices are sent CONTROL signals, prompting the flood light devices to switch ON their Bluetooth® capabilities.

Additionally, apart from assisting during navigation tasks, the PARTICIPATORS can periodically perform GPS and Bluetooth® scans and submit the results to the server. Such results can be used to update the estimated locations (with uncertainty radii) of clients and also to determine the Bluetooth® signal attenuation coefficients for different areas in the given environment. Further, in one or more embodiments of the invention, if a client-server communication fails, the client is considered temporarily unavailable.

FIG. 2A through FIG. 2E illustrate visualizations of an algorithm implemented according to an example embodiment of the invention. In conjunction with the example embodiment of the invention depicted in FIG. 2A through FIG. 2E, a server can obtain and/or maintain information pertaining to Bob 206 such as follows:

| UID | Latitude | Longitude | Uncertainty | Orientation |
| --- | --- | --- | --- | --- |
| Bob | 79.54654 | 23.54645 | 10 | N-E |

Additionally, in the noted example, Adam 204 reaches the given environment 202 (for example, a concert venue) and engages the application (executing an embodiment of the invention on Adam's client/user device) to display his (that is, Adam's) location on his user device. Note, for example, that this location can be displayed on top of a map of the given environment, or in connection with a standard map of a given geographic context (such as a street, a town, a country, etc.). Note also that positioning technologies such as GPS and Wi-Fi can be used to infer Adam's position with a certain degree of uncertainty, such as depicted via the circle surrounding Adam 204 (and, similarly, Bob 206) in FIG. 2A through FIG. 2E.

Figure 2A:
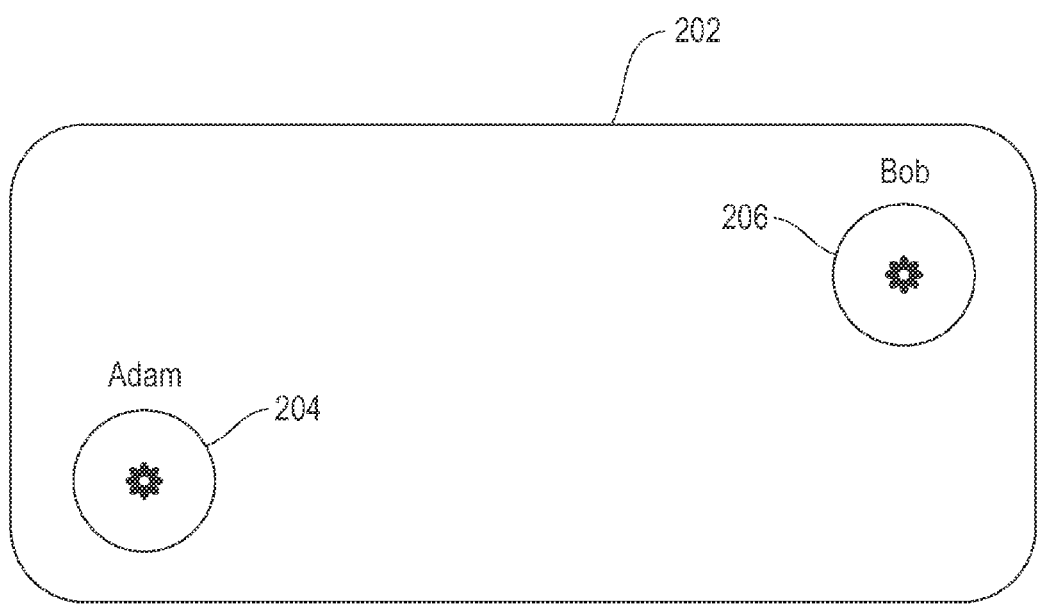
FIG. 2A through FIG. 2E illustrate visualizations of an algorithm implemented according to an example embodiment of the invention.

As depicted in FIG. 2A, Adam 204, via the application executing an embodiment of the invention on his user device (as well as on Bob's device), can query the server for the location, within the given environment 202, of Bob 206, whose position is also known by the server with a certain degree of uncertainty (as noted in the table above). Adam 204 can additionally prompt the application to help him navigate to Bob 206. The application can then carry out the following steps.

The application (executing an embodiment of the invention) determines the shortest path 210 (as depicted in FIG. 2B through FIG. 2E) from Adam 204 to Bob 206 based on one or more navigation solutions, and avoiding known obstacles in the given environment 202. For the purposes of the example embodiment illustrated in FIG. 2A through FIG. 2E, it is assumed that the given environment 202 includes no obstacles, thus the line 210 joining the centers of Adam 204 and Bob 206 represents the shortest path.

Figure 2B:
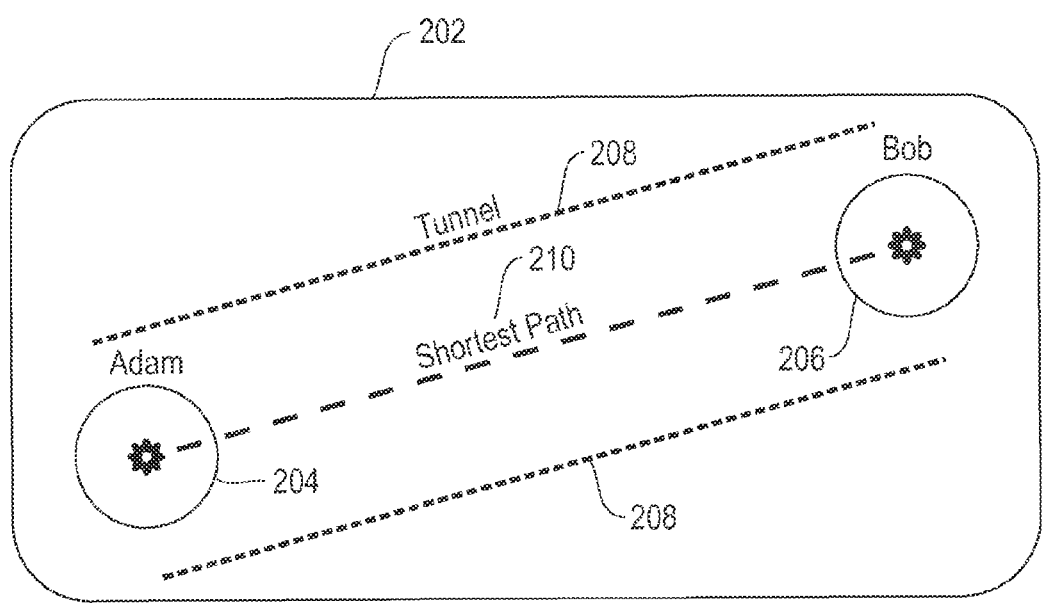

As also depicted in FIG. 2B, the application (executing an embodiment of the invention) defines a virtual tunnel 208 along and surrounding the shortest path 210. The virtual tunnel 208 is defined to maintain Adam's deviations as confined (within the virtual tunnel) and also allow Adam 204 the flexibility to pursue any direction and/or path to Bob 206 within the virtual tunnel 208 (in contrast to requiring Adam to exclusively follow the shortest path 210) without being served with repeated and/or multiple separate instructions to change course and converge to a straight line path, thus preventing oscillations. Such flexibility can enable Adam 204 to avoid variable obstacles, such as crowded regions of the environment that may form and disperse periodically and in real-time, while ensuring that Adam's convergence time is not compromised, thereby improving Adam's overall navigation experience.

Additionally, while FIG. 2B (as well as FIG. 2C, FIG. 2D and FIG. 2E) depicts a uniform width virtual tunnel, one or more embodiments of the invention can include implementing a tapered virtual tunnel to enable lower drifts and faster convergence.

Figure 2C:
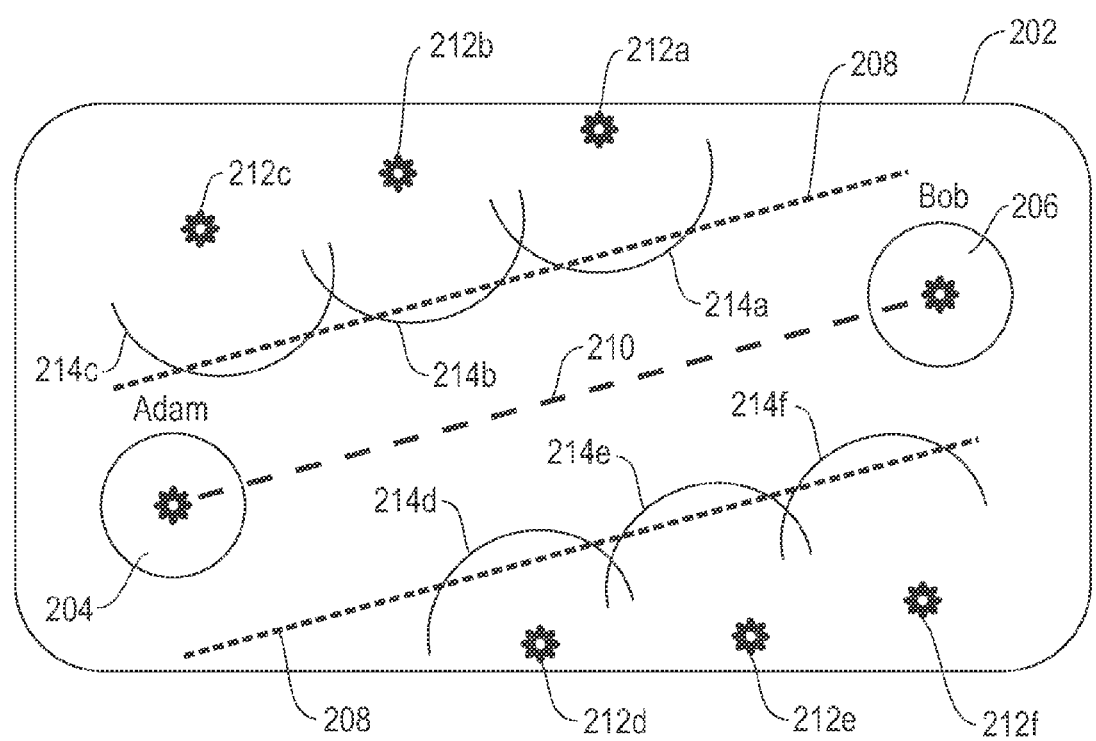

As depicted in FIG. 2C, a navigation service component (residing on device 120, as depicted in FIG. 1) operating in the application can query the server to infer guards 212a through 212f (hereinafter, collectively referred to as guards (or guard devices) 212), wherein the guards 212 are additional user devices within the given environment 202 implemented to ensure that Adam 204 does not deviate from the virtual tunnel 208. In accordance with at least one embodiment of the invention, guards 212 are chosen to be relatively far from the perimeter of the virtual tunnel 208 such that the range in which the guards 212 can transmit and receive Bluetooth® signals (shown as 214 in FIG. 2C) coincides with the perimeter of the virtual tunnel 208. This ensures that the GUARDS 212 can sense the devices (204 and 206) only when they exit the virtual tunnel and vice versa.

In one or more embodiments of the invention, the guards 212 are also executing an application that is executing an embodiment of the invention. However, as noted herein, at least one embodiment of the invention can also include utilizing beacon-emitting devices (for example, installed by event organizers at strategic locations) as guards.

Accordingly, in one or more embodiments of the invention, the guards 212 are implemented via utilization of beacon-emitting technologies such as Bluetooth®, so that each guard device 212a through 212f puts forth a corresponding signal range 214a through 214f (herein, collectively referred to as signal range 214) used for detection. The guards can be implemented multiple ways, such as described below.

For example, based on Bluetooth® scans of multiple user devices (such as mobile phones) present in the given environment 202, the guards 212 can periodically scan for nearby Bluetooth® devices and send the scan results to the server. Accordingly, as long as Adam 204 is within the virtual tunnel 208, no guard 212 will obtain a Bluetooth® signal from Adam 204 (that is, Adam's user device), and as soon as Adam 204 does stray outside of the virtual tunnel 208, one or more of the guards 212 will receive a Bluetooth® packet from Adam 204 (that is, Adam's user device) and detect Adam in a scan. By way merely of example, Bluetooth® signals commonly have a range of 10-15 meters, and as such, an example embodiment of the invention can include selecting GUARDS which are 10-15 meters away from the virtual tunnel.

Additionally, guard devices 212 can be implemented based on static infrastructural beacons. At least one embodiment of the invention includes deploying beacon-emitters at one or more strategic locations in the given environment. The client is provided the list of beacons acting as guards by the server. As and when the client senses a signal from any of these guards, the client can detect, locally, if Adam 204 has crossed the virtual tunnel 208 and notify Adam accordingly.

Further, in one or more embodiments of the invention, not all guards 212 need to be active at all times. Such an embodiment can include passing control from one guard device to a separate guard device in the case, for example, of single user navigation. This can be relevant when the guards are chosen from users in the crowd. Consider an example wherein Adam's navigation path is 100 meters long. In the first phase (or monitoring zone), only guards in the first 10 meters can have their Bluetooth® switched on and scan for devices (or the client can scan for them). After Adam crosses their monitoring zone (10 meters), those guards in the first 10 meters can switch off their Bluetooth®, and the next set of guards between 10-20 meters can become active. This is representative of "passing control," as noted above. In a case of multiple users, at least one embodiment of the invention includes selecting a number of guards sufficient to cover and/or service all navigating users.

Figure 2D:
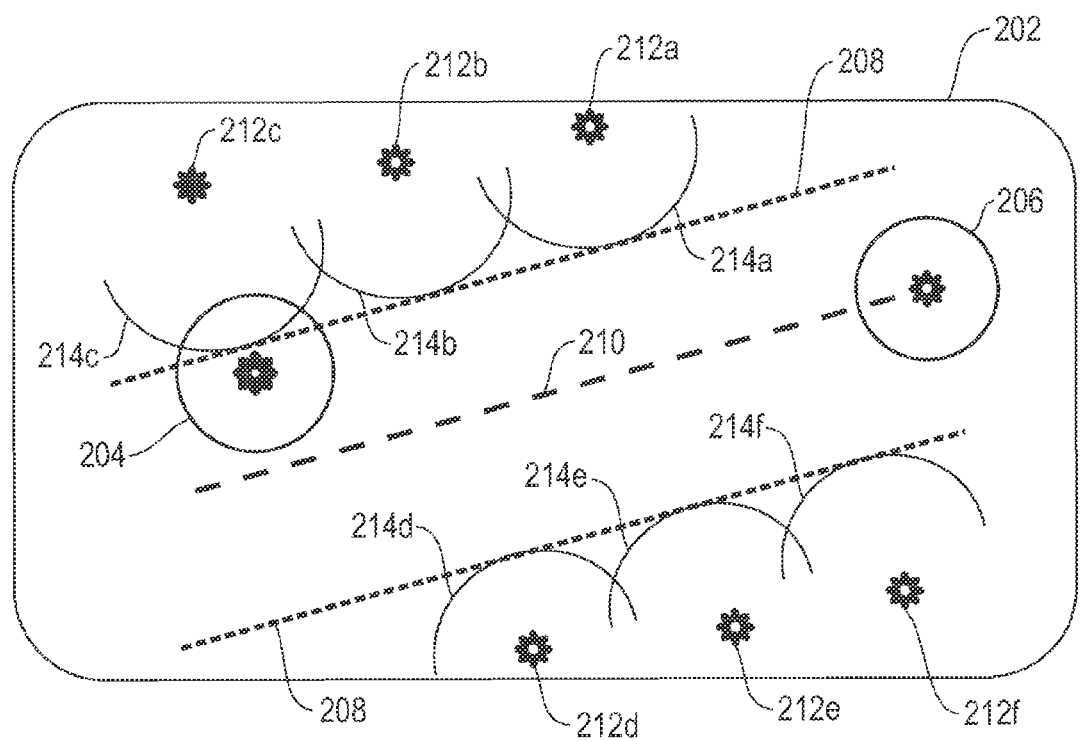
Figure 2E:
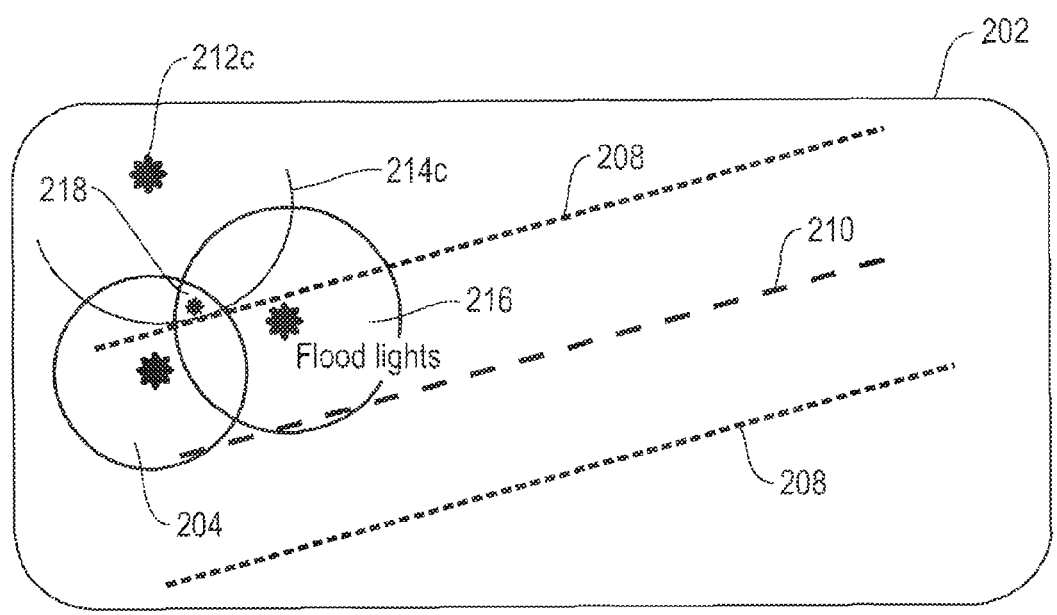

As depicted in FIG. 2D, a guard device (device 212c here) detects that Adam 204 is approaching the perimeter of the virtual tunnel 208 based on the Bluetooth® signal of Adam as well as the Bluetooth® signal 214c of the guard device 212c. Accordingly, as Adam 204 is navigating, if Adam 204 crosses outside of the perimeter of the virtual tunnel 208, one or more guards 212 alert the server that Adam 204 has crossed outside of the perimeter of the virtual tunnel 208. The server can then begin recalibrating Adam's location. Such recalibration is based on the concept of flood lights 216 (also referred to herein as flood light devices), as illustrated in FIG. 2E.

Flood light devices 216 include nodes that are detected to be near to the actual location of Adam 204, and that send the signal strength received from Adam's device 204 to the server. The server can use such signal strength readings to triangulate the position of Adam 204. Accordingly, FIG. 2E depicts flood light device 216, which detects Adam's location based on received Bluetooth® RSSI. Based on this information, a new inferred location 218 of Adam is identified. This inferred location can provide increased accuracy and serve as a re-calibration of Adam's position.

Consequently, as depicted in FIG. 2A through FIG. 2E, an example embodiment of the invention can include the following. Upon prompting the application (executing an embodiment of the invention on Adam's device 204) to NAVIGATE, the application instructs Adam 204 to travel along and/or within a defined virtual tunnel 208. Guards 212 are determined and implemented to act as sensor alarms that are triggered when Adam 204 leaves the virtual tunnel 204. When such an alarm is triggered, flood light devices are identified and implemented to assist in triangulating Adam's position, and the application presents to Adam his estimated location and prompts Adam to navigate back into the virtual tunnel 208.

Figure 3:
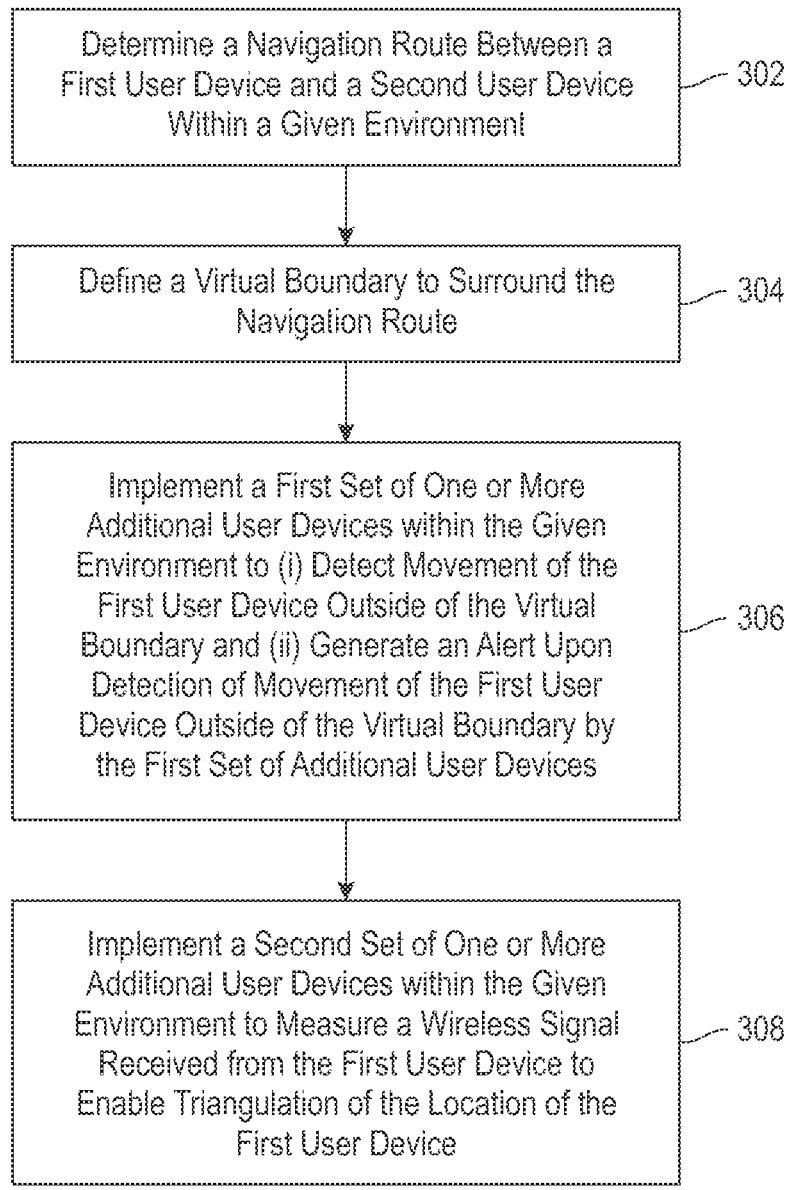
FIG. 3 is a flow diagram illustrating techniques according to an embodiment of the invention.

FIG. 3 is a flow diagram illustrating techniques according to an embodiment of the present invention. Step 302 includes determining a navigation route between a first user device and a second user device within a given environment, wherein said determining is executed by a module of a navigation computing device connected at least to (i) the first user device, (ii) the second user device, and (iii) one or more databases. Determining the navigation route can be based, for example, on approximate locations inferred from GPS, as well as on information pertaining to one or more obstacles present in the given environment. Such obstacles can include people and/or one or more structural components present within the given environment.

Step 304 includes defining a virtual boundary to surround the navigation route, wherein said defining is executed by a module of the navigation computing device. Defining the virtual boundary can include determining a given amount of acceptable deviation, by the first user device, from the navigation route.

Step 306 includes implementing a first set of one or more additional user devices within the given environment to (i) detect movement of the first user device outside of the virtual boundary and (ii) generate an alert upon detection of movement of the first user device outside of the virtual boundary, wherein said implementing the first set of additional user devices is executed by a module of the navigation computing device connected to the first set of additional user devices. Detecting movement of the first user device can include utilizing a sensor comprising a Bluetooth® sensor, an accelerometer and/or a GPS sensor. Also, generating the alert can include transmitting a trigger for the alert to a server.

Implementing the first set of one or more additional user devices can include selecting the one or more additional user devices for the first set based on distance from the virtual boundary, wherein the distance from the virtual boundary includes a distance such that the first user device is observable to the one or more additional user devices only when the first user device crosses the virtual boundary. Additionally, in at least one embodiment of the invention, the first set of one or more additional user devices can include one or more static beacons positioned at one or more fixed locations within the given environment.

Also, the first set of additional user devices can additionally transmit an instruction to the first user device to move back within the virtual boundary upon detection of movement of the first user device outside of the virtual boundary. In at least one embodiment of the invention, the first of additional user devices can only detect the deviation from the virtual tunnel, and the noted instruction is transmitted by the server or by the local client running on the device.

Implementing the first set of one or more additional user devices can include transferring exclusive detection control from one user device in the first set to one or more other user devices in the first set as the first user device progresses from a first monitoring zone within the navigation route to a second monitoring zone within the navigation route. Additionally, implementing the first set of additional user devices can include selecting a given number of additional user devices for the first set, wherein the given number of additional user devices is sufficient for detection of a given number of one or more navigating user devices.

Step 308 includes implementing a second set of one or more additional user devices within the given environment to measure a wireless signal received from the first user device to enable triangulation of the location of the first user device, in response to the alert, wherein said implementing the second set of additional user devices is executed by a module of the navigation computing device connected to the second set of additional user devices. The second set of additional user devices can include one or more additional user devices having coordinates that are known to the navigation computing device with a given level of accuracy.

The techniques depicted in FIG. 3 further include limiting oscillations of the first user device throughout the navigation route.

The techniques depicted in FIG. 3 can also include providing guidance to the first user device to return the first user device to within the virtual boundary upon generation of the alert by the first set of additional user devices, wherein said guidance is based on said triangulation of the location of the first user device. Additionally, in at least one embodiment of the invention, the first user device can include a smart phone associated with a first person present within the given environment, and the second user device can include a smart phone associated with a second person present within the given environment. Similarly, each user device in the first set of one or more additional user devices can include a smart phone associated with an additional person present within the given environment, and each user device in the second set of one or more additional user devices can include a smart phone associated with an additional person present within the given environment.

Also, an additional aspect of the invention includes a crowd-assisted navigation device that includes a navigation service module, executing on the crowd-assisted navigation device, to determine a navigation route between a first user device and a second user device within a given environment and define a virtual boundary to surround the navigation route. The device also includes a collaboration service module, executing on the crowd-assisted navigation device, to implement a first set of one or more additional user devices within the given environment to (i) detect movement of the first user device outside of the virtual boundary and (ii) generate an alert upon detection of movement of the first user device outside of the virtual boundary. The collaboration service module also implements a second set of one or more additional user devices within the given environment to measure a wireless signal received from the first user device to enable triangulation of the location of the first user device, in response to the alert. Further, the device additionally includes a coordination module, executing on the crowd-assisted navigation device, to coordinate communication between the navigation service module and the collaboration service module. Also, the navigation service module, the collaboration service module, and the coordination module are coupled to (i) a graphical user interface for user manipulation of the crowd-assisted navigation device, and (ii) a display for presentation to a user.

In at least one embodiment of the invention, the collaboration service module is further executed on the crowd-assisted navigation device to learn a radio map of the given environment, and then the radio map is used to model one or more attenuation coefficients. The collaboration service module can also be executed on the crowd-assisted navigation device to utilize the one or more attenuation coefficients in connection with one or more additional user devices to detect a proximity of the first user device.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
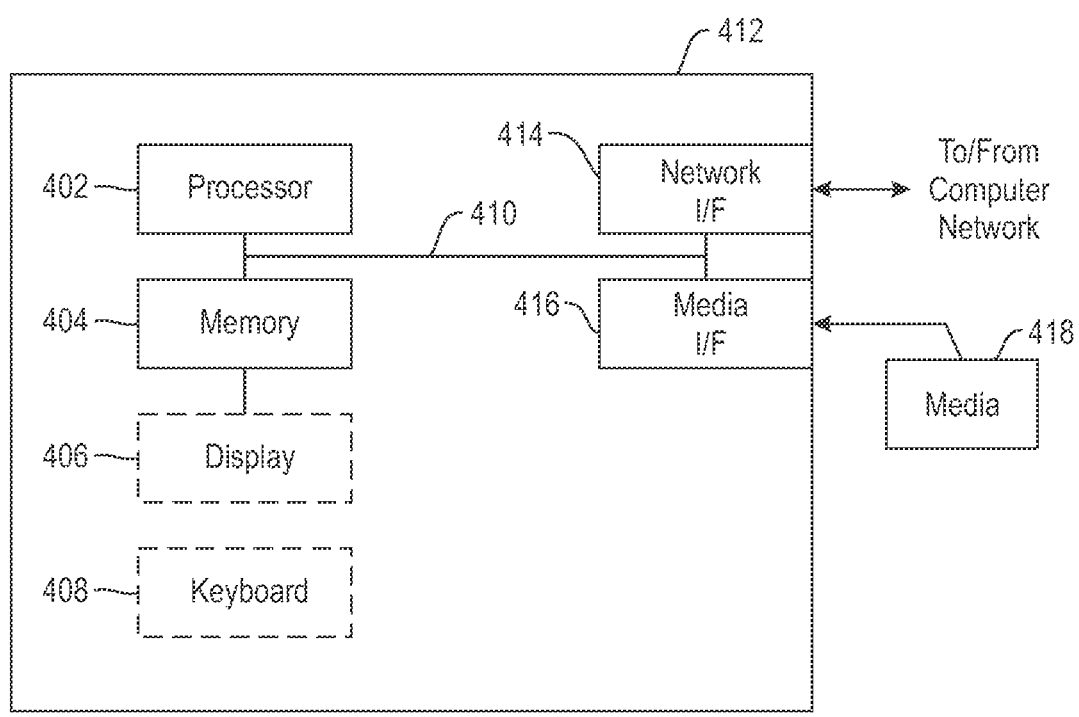
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing a tunneling algorithm that allows for bounded drifts as compared to a straight-line navigation, as well as incorporating the use of pivot points as (i) guards, which prevent a navigating user from deviating from the virtual tunnel, and (ii) flood lights, which localize a user to a more accurate location if the guards detect that the user has crossed the virtual tunnel bounds.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising steps of:
    determining a navigation route between a first user device and a second user device within a given environment, wherein the determining step is executed by a module of a navigation computing device connected at least to (i) the first user device, (ii) the second user device, and (iii) one or more databases;
    defining a virtual boundary to surround the navigation route, wherein the defining step is executed by a module of the navigation computing device;
    implementing a first set of one or more additional user devices within the given environment to (i) detect movement of the first user device outside of the virtual boundary and (ii) generate an alert upon detection of movement of the first user device outside of the virtual boundary, wherein implementing the first set of one or more additional user devices is executed by a module of the navigation computing device connected to the first set of one or more additional user devices; and
    implementing a second set of one or more additional user devices within the given environment to measure the strength of a wireless signal received from the first user device to enable triangulation of a location of the first user device, in response to the alert, wherein implementing the second set of one or more additional user devices is executed by a module of the navigation computing device connected to the second set of one or more additional user devices.

2. The method of claim 1, wherein generating the alert comprises transmitting a trigger for the alert to a server.

3. The method of claim 1, comprising:
    limiting a number of oscillations of the first user device throughout the navigation route.

4. The method of claim 1, wherein implementing the first set of one or more additional user devices comprises selecting the one or more additional user devices for the first set based on distance from the virtual boundary, wherein the distance from the virtual boundary comprises a distance such that the first user device is observable to the first set of one or more additional user devices only when the first user device crosses the virtual boundary.

5. The method of claim 1, wherein the first set of one or more additional user devices comprises one or more static beacons positioned at one or more fixed locations within the given environment.

6. The method of claim 1, comprising:
    providing guidance to the first user device to return the first user device to within the virtual boundary upon generation of the alert by the first set of one or more additional user devices, wherein the guidance is based on the triangulation of the location of the first user device.

7. The method of claim 1, wherein determining the navigation route is based on location estimates provided by a positioning technology on the first user device and the second user device.

8. The method of claim 1, wherein determining the navigation route is based on information pertaining to one or more obstacles present in the given environment, wherein the one or more obstacles comprise at least one of people and one or more structural components present within the given environment.

9. The method of claim 1, wherein defining the virtual boundary comprises determining a given amount of deviation, by the first user device, from the navigation route.

10. The method of claim 1, wherein the first set of one or more additional user devices further transmits an instruction to the first user device to move back within the virtual boundary upon detection of movement of the first user device outside of the virtual boundary.

11. The method of claim 1, wherein implementing the first set of one or more additional user devices comprises transferring exclusive detection control from one user device in the first set of one or more additional user devices to one or more other user devices in the first set of one or more additional user devices as the first user device progresses from a first monitoring zone within the navigation route to a second monitoring zone within the navigation route.

12. The method of claim 1, wherein implementing the first set of one or more additional user devices comprises selecting a given number of additional user devices for the first set of one or more additional user devices, wherein the given number of additional user devices is sufficient for detection of a given number of one or more separate navigating user devices.

13. The method of claim 1, wherein detecting movement of the first user device comprises utilizing a sensor comprising at least one of a wireless data exchange sensor, an accelerometer and a global positioning system (GPS) sensor.

14. The method of claim 1, wherein the second set of one or more additional user devices comprises one or more additional user devices having coordinates that are known to the navigation computing device.

15. The method of claim 1, wherein the first user device comprises a smart phone associated with a first person present within the given environment, wherein the second user device comprises a smart phone associated with a second person present within the given environment, wherein each user device in the first set of one or more additional user devices comprises a smart phone associated with an additional person present within the given environment, and wherein each user device in the second set of one or more additional user devices comprises a smart phone associated with an additional person present within the given environment.

16. A non-transitory computer readable storage medium having program instructions embodied therewith, the program instructions comprising:
    determining a navigation route between a first user device and a second user device within a given environment;
    defining a virtual boundary to surround the navigation route;
    implementing a first set of one or more additional user devices within the given environment to (i) detect movement of the first user device outside of the virtual boundary and (ii) generate an alert upon detection of movement of the first user device outside of the virtual boundary; and
    implementing a second set of one or more additional user devices within the given environment to measure the strength of a wireless signal received from the first user device to enable triangulation of a location of the first user device, in response to the alert.

17. A system comprising:
    a memory; and
    at least one processor coupled to the memory and configured for:
        determining a navigation route between a first user device and a second user device within a given environment;
        defining a virtual boundary to surround the navigation route;
        implementing a first set of one or more additional user devices within the given environment to (i) detect movement of the first user device outside of the virtual boundary and (ii) generate an alert upon detection of movement of the first user device outside of the virtual boundary; and
        implementing a second set of one or more additional user devices within the given environment to measure the strength of a wireless signal received from the first user device to enable triangulation of a location of the first user device, in response to the alert.

18. A crowd-assisted navigation device comprising:
    a navigation service module, executing on the crowd-assisted navigation device, to:
        determine a navigation route between a first user device and a second user device within a given environment; and
        define a virtual boundary to surround the navigation route;
    a collaboration service module, executing on the crowd-assisted navigation device, to:
        implement a first set of one or more additional user devices within the given environment to (i) detect movement of the first user device outside of the virtual boundary and (ii) generate an alert upon detection of movement of the first user device outside of the virtual boundary; and
        implement a second set of one or more additional user devices within the given environment to measure the strength of a wireless signal received from the first user device to enable triangulation of a location of the first user device, in response to the alert; and
    a coordination module, executing on the crowd-assisted navigation device, to coordinate communication between the navigation service module and the collaboration service module;
    wherein the navigation service module, the collaboration service module, and the coordination module are coupled to (i) a graphical user interface for user manipulation of the crowd-assisted navigation device and (ii) a display for presentation to a user.

19. The device of claim 18, wherein the collaboration service module is executed on the crowd-assisted navigation device to:
    learn a map of the given environment; and
    use the map to model one or more attenuation coefficients.

20. The device of claim 19, wherein the collaboration service module is executed on the crowd-assisted navigation device to:

utilize the one or more attenuation coefficients in connection with one or more additional user devices to detect a proximity of the first user device.

\* \* \* \* \*